United States Patent
Hibino et al.

(10) Patent No.: US 11,781,599 B2
(45) Date of Patent: Oct. 10, 2023

(54) CONSTANT VELOCITY JOINT

(71) Applicant: HONDA MOTOR CO., LTD., Tokyo (JP)

(72) Inventors: Yusuke Hibino, Tokyo (JP); Masayoshi Nakamura, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 157 days.

(21) Appl. No.: 17/207,791

(22) Filed: Mar. 22, 2021

(65) Prior Publication Data
US 2021/0301879 A1  Sep. 30, 2021

(30) Foreign Application Priority Data

Mar. 26, 2020 (JP) ................. 2020-055218

(51) Int. Cl.
*F16D 3/205* (2006.01)
*F16D 3/202* (2006.01)

(52) U.S. Cl.
CPC .... *F16D 3/2055* (2013.01); *F16D 2003/2026* (2013.01); *Y10S 464/905* (2013.01)

(58) Field of Classification Search
CPC .......... F16D 3/2055; F16D 2003/2026; Y10S 464/905
USPC ....................................... 464/111
See application file for complete search history.

(56) References Cited

U.S. PATENT DOCUMENTS

| | | | |
|---|---|---|---|
| 5,989,124 A | 11/1999 | Goto et al. | |
| 9,618,055 B2 * | 4/2017 | Tsujimoto | F16D 3/2055 |
| 11,506,245 B2 * | 11/2022 | Bono | F16D 3/2055 |

| | | | |
|---|---|---|---|
| 2008/0287202 A1 | 11/2008 | Oh | |
| 2012/0329564 A1 | 12/2012 | Itagaki et al. | |
| 2015/0219165 A1 | 8/2015 | Tsujimoto et al. | |

(Continued)

FOREIGN PATENT DOCUMENTS

| | | |
|---|---|---|
| CN | 102859219 | 1/2013 |
| CN | 104832553 | 8/2015 |
| CN | 105443598 | 3/2016 |

(Continued)

OTHER PUBLICATIONS

Chinese Office Action for Chinese Patent Application No. 202110321710.4 dated Jun. 20, 2023.

(Continued)

*Primary Examiner* — Greg Binda
(74) *Attorney, Agent, or Firm* — AMIN, TUROCY & WATSON, LLP (57) ABSTRACT

An inner member of a constant velocity joint includes holding portions that hold roller assemblies. Each of the holding portions includes a first orthogonal part and a second orthogonal part brought into contact with an inner roller of the roller assembly. When first and second transmission shafts are coaxially disposed, top parts of the first and second orthogonal parts are brought into contact with the inner circumferential wall of the inner roller. The first and second orthogonal parts are each sectioned into a first curved surface extending from the proximal end of the holding portion to the top part and a second curved surface extending from the top part to the distal end of the holding portion. The curvature radius of the second curved surfaces is larger than the curvature radius of the first curved surfaces.

4 Claims, 12 Drawing Sheets

(56) References Cited

U.S. PATENT DOCUMENTS

2016/0084319 A1    3/2016  Tsujimoto
2017/0241481 A1    8/2017  Kobata

FOREIGN PATENT DOCUMENTS

| CN | 107120358 | 9/2017 |
|----|-----------|--------|
| JP | 2000-170784 | 6/2000 |
| JP | 2009-019676 | 1/2009 |
| JP | 2011-185346 | 9/2011 |
| JP | 5934266 | 6/2016 |
| KR | 10-2004-0071382 | 8/2004 |

OTHER PUBLICATIONS

Japanese Office Action for Japanese Patent Application No. 2020-055218 dated Aug. 8, 2023.

* cited by examiner

CONSTANT VELOCITY JOINT

CROSS-REFERENCE TO RELATED APPLICATION

This application is based upon and claims the benefit of priority from Japanese Patent Application No. 2020-055218 filed on Mar. 26, 2020, the contents of which are incorporated herein by reference.

BACKGROUND OF THE INVENTION

Field of the Invention

The present invention relates to constant velocity joints disposed between first transmission shafts and second transmission shafts to transmit rotational driving force from the first transmission shafts to the second transmission shafts.

Description of the Related Art

A typical tripod constant velocity joint includes an outer member including a transmission shaft portion and a bottomed cup portion that is provided with a plurality of (typically three) guide grooves formed in the inner wall of the cup portion and an inner member fitted on an end of a driving-force transmission shaft. In this structure, rotational driving force is transmitted from the driving-force transmission shaft to the transmission shaft portion or in the opposite direction.

The inner member includes holding portions fitted in the guide grooves. Rollers sliding inside the guide grooves are rotatably held by the holding portions. When the driving-force transmission shaft is inclined with respect to the transmission shaft portion by a predetermined working angle, the inner member is inclined inside the outer member, and thereby parts of the inner member that are in contact with the inner circumferential walls of the rollers are changed. As described in Japanese Laid-Open Patent Publication No. 2009-019676, it is assumed that the change causes an increase in induced thrust.

In the technology described in Japanese Laid-Open Patent Publication No. 2009-019676, protrusions are formed on a curved sidewall of a holding portion ("tripod shaft" in Japanese Laid-Open Patent Publication No. 2009-019676). The protrusions are brought into contact with the inner circumferential wall of a roller at parts of the protrusions with maximum protruding lengths.

In contrast, the inventors have proposed, in Japanese Patent No. 5934266, a simple structure that can be easily formed by, for example, forging and that can reduce sliding resistance, which causes an in increase in induced thrust. Noise and vibration are expected to be reduced by reducing sliding resistance.

SUMMARY OF THE INVENTION

A principal object of the present invention is to provide a constant velocity joint in which contact load between a holding portion and a roller is stable.

Another object of the present invention is to provide a constant velocity joint facilitating rotation of the roller to reduce frictional resistance between the roller and a wall surface of a guide groove.

According to an aspect of the present invention, a constant velocity joint disposed between a first transmission shaft and a second transmission shaft to transmit rotational driving force from the first transmission shaft to the second transmission shaft is provided.

The constant velocity joint includes an outer member and connected to the first transmission shaft; an inner member connected to the second transmission shaft and fitted in the outer member; and a plurality of roller assemblies. A plurality of guide grooves is provided in an inner wall of the outer member, being separated from each other at a predetermined distance and extending in an axial direction of the outer member. The inner member includes a plurality of holding portions each of which protrudes from an annular portion toward the corresponding guide groove and includes a proximal end adjacent to the annular portion and a distal end adjacent to the guide groove. Each of the roller assemblies is rotatably attached to the corresponding holding portion. Each of the roller assemblies includes an inner roller and an outer roller, the outer roller being attached to an outside of the inner roller via a rolling member.

Each of the holding portions is provided with a plurality of contact parts brought into contact with an inner circumferential wall of the corresponding inner roller and a plurality of non-contact parts separated from the inner circumferential wall of the inner roller, the contact parts and the non-contact parts being disposed alternately.

The contact parts include at least a first parallel part and a second parallel part being parallel to a longitudinal direction of the guide grooves, and a first orthogonal part and a second orthogonal part, virtual tangents to the respective orthogonal parts being orthogonal to the longitudinal direction of the guide grooves. The first parallel part and the second parallel part have a phase difference of 180°. The first orthogonal part and the second orthogonal part also have a phase difference of 180°.

Sidewalls of the first parallel part and the second parallel part are straight in a front cross-section. The side cross-section passes through the first parallel part, a radial center of the holding portion, and the second parallel part.

Sidewalls of the first orthogonal part and the second orthogonal part are curved in a side cross-section. The side cross-section passes through the first orthogonal part, the radial center of the holding portion, and the second orthogonal part.

A top part is defined as a part of each of the sidewalls of the first orthogonal part and the second orthogonal part, being brought into contact with the inner circumferential wall while the first transmission shaft and the second transmission shaft are coaxially disposed. First curved surfaces are defined as curved surfaces of the first orthogonal part and the second orthogonal part extending from the proximal end toward the respective top parts. Second curved surfaces are defined as curved surfaces of the first orthogonal part and the second orthogonal part extending from the respective top parts toward the distal end. In this state, a curvature radius of the second curved surfaces is larger than a curvature radius of the first curved surfaces.

According to the present invention, in each of the holding portions, the curvature radius of the second curved surfaces extending from the top parts, at which the holding portion has the largest diameter, toward the distal end is larger than the curvature radius of the first curved surfaces extending from the proximal end toward the top parts. Consequently, when the second transmission shaft is inclined with respect to the first transmission shaft to form a predetermined joint angle and, in particular, at a large phase angle, the first curved surface or the second curved surface of the first orthogonal part and the second curved surface or the first curved surface of the second orthogonal part are brought into contact with the inner circumferential wall of the corresponding inner roller.

This leads to a stable contact load in the constant velocity joint, and as a result, the roller assemblies can rotate inside the respective guide grooves more easily. Additionally, since the first orthogonal part and the second orthogonal part are in contact with the inner circumferential wall of the corresponding inner roller, each of the roller assemblies is kept parallel to the corresponding guide groove. Due to the reasons above, the frictional resistance between the roller assemblies and the wall surfaces of the respective guide grooves is reduced. This results in a reduction in sliding resistance, thus reducing induced thrust.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

A preferred embodiment of a constant velocity joint according to the present invention will be described in detail below with reference to the accompanying drawings.

Figure 1:
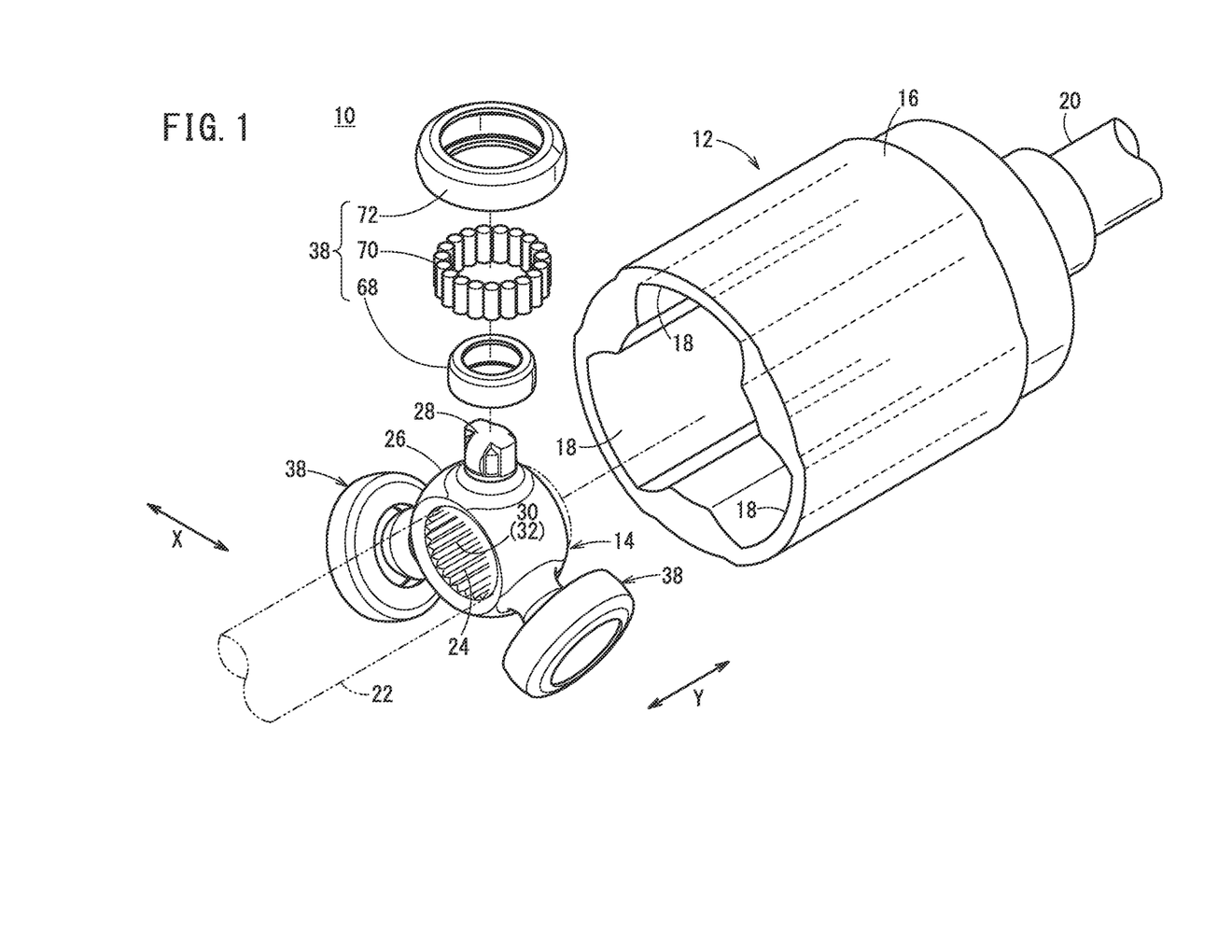
FIG. 1 is a schematic exploded perspective view of a constant velocity joint according to an embodiment of the present invention.
Figure 2:
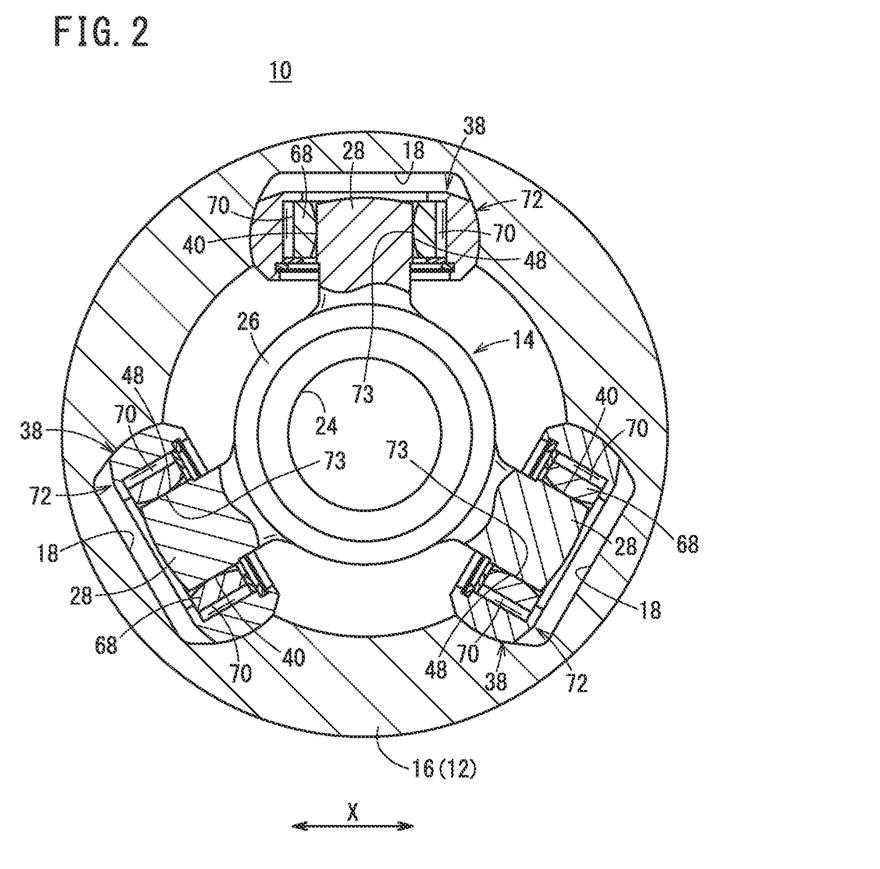
FIG. 2 is a schematic front cross-sectional view of the constant velocity joint in FIG. 1.

FIGS. 1 and 2 are a schematic exploded perspective view and a schematic front cross-sectional view, respectively, of a constant velocity joint 10 according to this embodiment. The constant velocity joint 10 includes an outer member 12 and an inner member 14. In FIG. 1, an arrow X indicates the transverse direction of the outer member 12, and an arrow Y indicates the longitudinal direction of the outer member 12. The direction of the arrow X (X direction) and the direction of the arrow Y (Y direction) are orthogonal to each other.

The outer member 12 includes a cup portion 16 having a bottomed cylindrical shape. The cup portion 16 is provided with three guide grooves 18 formed in the inner wall with a phase difference of 120°. The guide grooves 18 each have an opening at a first end of the cup portion 16 and extend to the bottom wall in the longitudinal direction of the cup portion 16. A shaft portion 20 (first transmission shaft) extending in the longitudinal direction of the outer member 12 is disposed on the outside of the bottom wall. The shaft portion 20 is connected to, for example, a rotating shaft of a transmission (not illustrated) to transmit the rotational driving force to a second transmission shaft 22 via the cup portion 16 and the inner member 14.

The inner member 14 includes an annular portion 26 having a ring shape formed by creating a through-hole 24 in a disk and three trunnions (holding portions) 28 protruding from the sidewall of the annular portion 26. The through-hole 24 extends in a direction in which the cup portion 16 and the second transmission shaft 22 extend. Splines 30 extend on the inner wall of the annular portion 26 in the axial direction of the through-hole 24. In the description below, a first end of each trunnion 28 adjacent to the annular portion 26 is also indicated as a proximal end, and a second end separated from the annular portion 26 (adjacent to the corresponding guide groove 18) is also indicated as a distal end. Moreover, a direction from the proximal end to the distal end or the opposite direction is also referred to as an axial direction of the trunnion 28.

The splines 30 mesh with splines 32 formed on the circumferential sidewall of the second transmission shaft 22 when an end portion of the second transmission shaft 22 is fitted in the through-hole 24. The second transmission shaft 22 is connected to the inner member 14 as the splines 30 and 32 mesh with each other.

Two adjacent trunnions 28 are separated from each other by 120°; that is, the phase difference between the trunnions 28 corresponds to the phase difference between the guide grooves 18. The trunnions 28 extend toward the respective guide grooves 18. A roller assembly 38 is rotatably attached to each trunnion 28.

Figure 3:
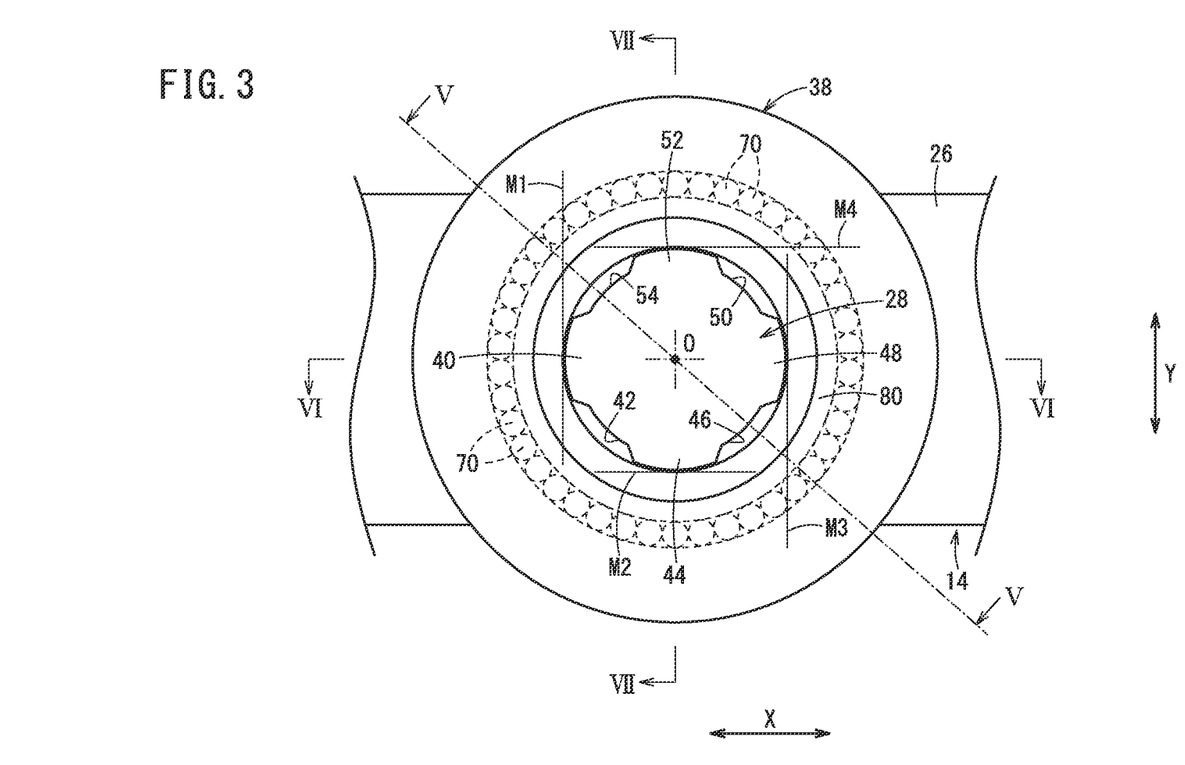
FIG. 3 is a plan view of a trunnion (holding portion) to which a roller assembly is attached.
Figure 4:
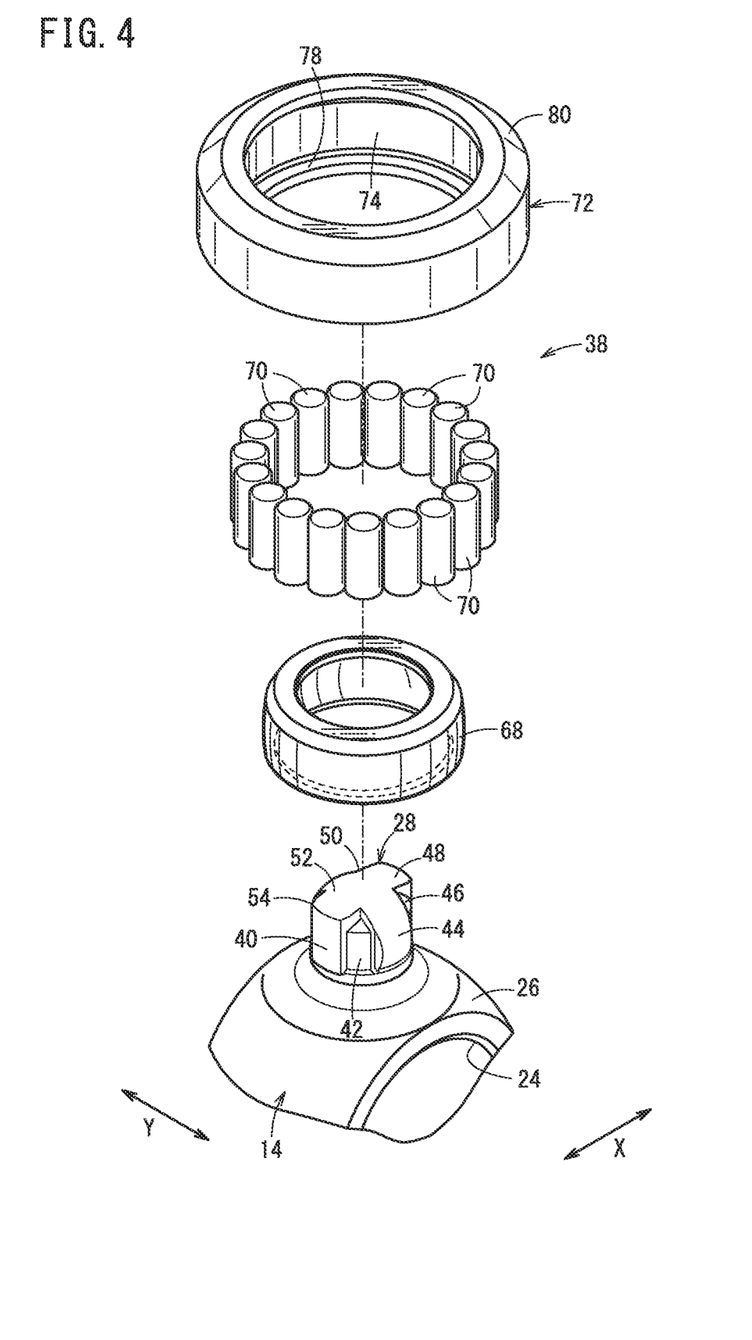
FIG. 4 is an exploded perspective view of the disassembled roller assembly and the trunnion.

FIG. 3 is a plan view of one of the trunnions 28 to which a roller assembly 38 is attached. FIG. 4 is an exploded perspective view of the disassembled roller assembly 38 and the trunnion 28. The X direction and the Y direction in FIGS. 3 and 4 correspond to the X direction and the Y direction in FIG. 1, respectively.

The shape of the trunnions 28 will now be described in detail. Each of the trunnions 28 includes a first protrusion 40, a first depression 42, a second protrusion 44, a second depression 46, a third protrusion 48, a third depression 50, a fourth protrusion 52, and a fourth depression 54 adjoining each other. That is, in this case, the protrusions and depressions are disposed alternately, and thereby the sidewall of the trunnion 28 radially undulates. Due to the undulations, the trunnion 28 is substantially cross-shaped when viewed in plan (see FIG. 3). The first protrusion 40 and the third protrusion 48 are rotationally symmetric with each other, and the phase difference between the protrusions is 180°. Similarly, the second protrusion 44 and the fourth protrusion 52 are rotationally symmetric with each other, and the phase difference between the protrusions is 180°.

The trunnion 28 is brought into contact with the inner circumferential wall of an inner roller 68 constituting the roller assembly 38 only at curved side surfaces of the first protrusion 40, the second protrusion 44, the third protrusion 48, and the fourth protrusion 52. In contrast, the first depression 42, the second depression 46, the third depression 50, and the fourth depression 54 are separated from the inner circumferential wall of the inner roller 68. That is, the first protrusion 40, the second protrusion 44, the third protrusion 48, and the fourth protrusion 52 are contact parts brought into contact with the inner circumferential wall of the inner roller 68, and the first depression 42, the second depression 46, the third depression 50, and the fourth depression 54 are non-contact parts separated from (that are not brought into contact with) the inner circumferential wall of the inner roller 68.

As illustrated in FIG. 3, virtual tangents M1, M2, M3, and M4 can be drawn to the first protrusion 40, the second protrusion 44, the third protrusion 48, and the fourth protrusion 52, respectively. The virtual tangent M1 to the first protrusion 40 and the virtual tangent M3 to the third protrusion 48 are parallel to the Y direction, whereas the virtual tangent M2 to the second protrusion 44 and the virtual tangent M4 to the fourth protrusion 52 are parallel to the X direction. Since the X direction is orthogonal to the Y direction, the virtual tangents M2 and M4 are orthogonal to the Y direction.

As can be seen from the above, the first protrusion 40 and the third protrusion 48 are a first parallel part and a second parallel part, respectively, at which the virtual tangents M1 and M3 are parallel to the longitudinal direction of the guide grooves 18. In contrast, the second protrusion 44 and the fourth protrusion 52 are a first orthogonal part and a second orthogonal part, respectively, at which the virtual tangents M2 and M4 are orthogonal to the longitudinal direction of the guide grooves 18. That is, in the trunnion 28, the first protrusion 40 serving as the first parallel part, the third protrusion 48 serving as the second parallel part, the second protrusion 44 serving as the first orthogonal part, and the fourth protrusion 52 serving as the second orthogonal part are brought into contact with the inner circumferential wall of the inner roller 68.

Figure 5:
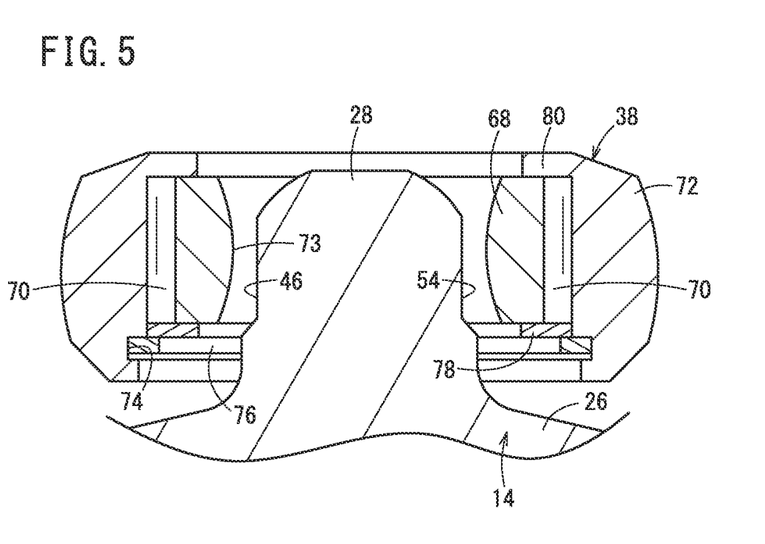
FIG. 5 is a cross-sectional view taken along line V-V in FIG. 3.
Figure 6:
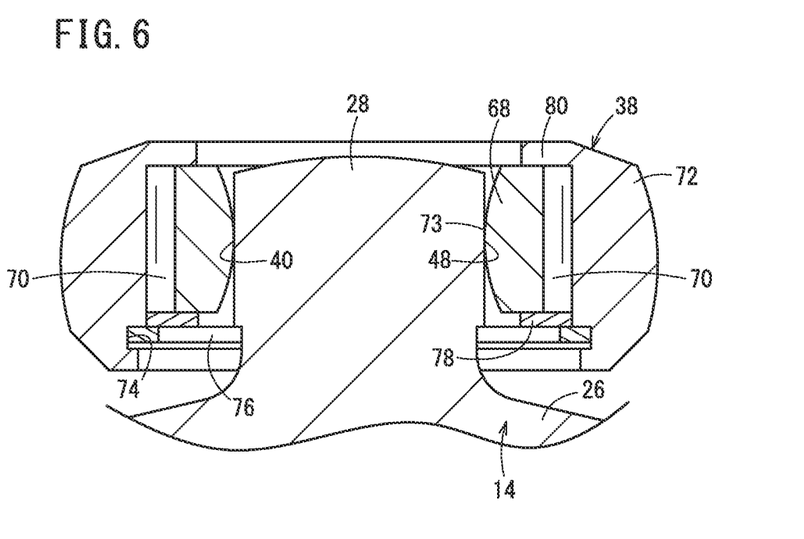
FIG. 6 is a cross-sectional view taken along line VI-VI in FIG. 3.
Figure 7:
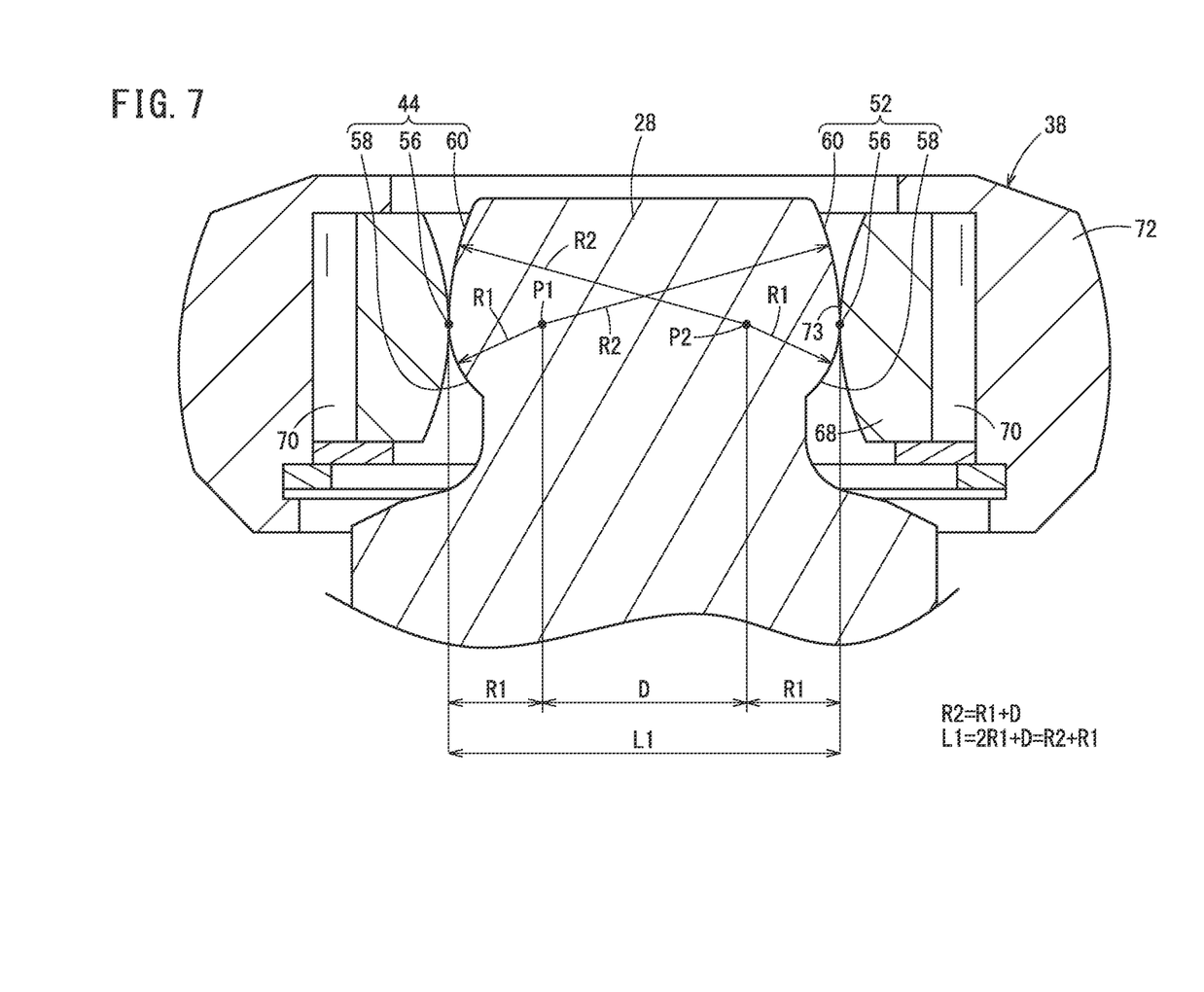
FIG. 7 is a cross-sectional view taken along line VII-VII in FIG. 3.

FIGS. 5, 6, and 7 are cross-sectional views taken along lines V-V, VI-VI, and VII-VII, respectively, in FIG. 3. As illustrated in FIG. 3, all the lines pass through the center O serving as the radial center of the trunnion 28. As can also be seen from FIG. 5, the second depression 46 and the fourth depression 54 serving as the non-contact parts are separated from the inner circumferential wall of the inner roller 68.

As illustrated in FIG. 6, the first protrusion 40 (first parallel part) and the third protrusion 48 (second parallel part) have a diameter substantially unchanging from the proximal end, which is adjacent to the annular portion 26, to the distal end. As a result, in the cross-section taken along line VI-VI in FIG. 3 passing through the first protrusion 40, the center O, and the third protrusion 48, that is, a front cross-section, sidewalls of the first protrusion 40 and the third protrusion 48 are straight.

In contrast, as illustrated in FIG. 4, the second protrusion 44 (first orthogonal part) and the fourth protrusion 52 (second orthogonal part) have a diameter changing in the axial direction of the trunnion 28. As a result, in the cross-section taken along line VII-VII in FIG. 3 passing through the second protrusion 44, the center O, and the fourth protrusion 52, that is, a side cross-section, sidewalls of the second protrusion 44 and the fourth protrusion 52 are arc-shaped as illustrated in FIG. 7.

When the shaft portion 20 and the second transmission shaft 22 are coaxially disposed (see FIG. 1), the axial direction of each trunnion 28 is substantially orthogonal to the Y direction serving as the direction of extension of the guide grooves 18 (see FIG. 2). In this state, parts of the second protrusion 44 and the fourth protrusion 52, at which the diameter is the maximum, are brought into contact with the inner circumferential wall of the inner roller 68. In the description below, the contact parts are indicated as top parts and denoted by reference number 56.

Each curved surface of the second protrusion 44 and the fourth protrusion 52 is sectioned into a first curved surface 58 and a second curved surface 60 on either side of the top part 56. The first curved surface 58 extends from the proximal end to the top part 56, whereas the second curved surface 60 extends from the top part 56 to the distal end. In the second protrusion 44, the curvature center of the first curved surface 58 is a point P1, and the curvature center of the second curved surface 60 is a point P2. In the fourth protrusion 52, the curvature center of the first curved surface 58 is the point P2, and the curvature center of the second curved surface 60 is the point P1. That is, the curvature center of the first curved surface 58 of the second protrusion 44 and the curvature center of the second curved surface 60 of the fourth protrusion 52 coincide at the point P1. Similarly, the curvature center of the second curved surface 60 of the second protrusion 44 and the curvature center of the first curved surface 58 of the fourth protrusion 52 coincide at the point P2.

The distance from the curvature center P1 to the adjacent top part 56 and the distance from the curvature center P2 to the adjacent top part 56 are equal to each other. The distance from the curvature center P1 to the top part 56 equals to the curvature radius of the first curved surface 58. In the description below, the curvature radius of the first curved surface 58 is defined as a curvature radius R1, and the distance between the curvature center P1 and the curvature center P2 is defined as a distance D. The curvature radius R2 of the second curved surface 60 of the second protrusion 44 equals to the distance from the curvature center P2 to the top part 56 of the second protrusion 44, that is, the sum of D and R1.

Similarly, the curvature radius R2 of the second curved surface 60 of the fourth protrusion 52 also equals to the distance from the curvature center P1 to the top part 56 of the fourth protrusion 52, that is, the sum of D and R1. That is, the following relation holds for the curvature radii R1 and R2 and the distance D:

$$R2 = R1 + D.$$

As can be understood from the relation, the curvature radius R2 of the second curved surface 60 is larger than the curvature radius R1 of the first curved surface 58.

Each of the roller assemblies 38 includes the inner roller 68 and a cylindrical outer roller 72 fitted on the inner roller 68 via a plurality of needle rollers 70 serving as rolling members. As illustrated in FIGS. 4 to 7, the inner circumferential wall of the inner roller 68 in this embodiment has an arc shape protruding toward the trunnion 28 so that the middle part of the height (axial middle part) is the closest to the trunnion 28. That is, the inside diameter of the inner roller 68 is the smallest at the middle part of the height. In the description below, the part is indicated as a minimum inside-diameter part and denoted by reference number 73. The minimum inside-diameter part 73 is brought into contact with the first protrusion 40, the second protrusion 44, the third protrusion 48, and the fourth protrusion 52.

An annular groove 74 is formed in the inner circumferential wall of the outer roller 72. A snap ring 76 is fitted in the annular groove 74 so that a retaining ring 78 is positioned and secured inside the outer roller 72. The plurality of needle rollers 70 are held to be rollable inside the outer roller 72 by the retaining ring 78 and a flange part 80 of the outer roller 72.

Although not illustrated, part of the constant velocity joint 10 from the cup portion 16 to the second transmission shaft 22 is enclosed by a grease-filled joint boot.

The constant velocity joint 10 according to this embodiment is basically configured as above. Next, the operational effects thereof will be described.

The constant velocity joint 10 is installed in, for example, a body of a four-wheeled automobile and functions as a medium that transmits rotational driving force of an internal combustion engine or a motor to drive wheels (tires). When the rotational driving force is input to the shaft portion 20, the shaft portion 20 and, by extension, the outer member 12 start rotating. The rotational driving force is transmitted to the inner member 14 via the trunnions 28 fitted in the guide grooves 18 of the outer member 12, and then transmitted to the second transmission shaft 22 on which the inner member 14 is fitted. As a result, the second transmission shaft 22 rotates in the same direction as the shaft portion 20 (first transmission shaft).

When the second transmission shaft 22 is displaced in the axial direction, the roller assemblies 38 slide along the respective guide grooves 18 while being restrained in the guide grooves 18.

When a driver turns a steering wheel to control the direction of the automobile, the second transmission shaft 22 is inclined with respect to the shaft portion 20. The intersecting angle between the shaft portion 20 and the second transmission shaft 22 at this moment is defined as a joint angle. Since the second transmission shaft 22 is inclined, the inner member 14 is inclined relative to the outer member 12 (see FIG. 9). The constant velocity joint 10 rotates in this state. In the description below, a phase when one of the three guide grooves 18 is located at the vertically highest point (top dead center) as illustrated in, for example, FIG. 2, is defined as an initial phase, that is, 0°, and a rotation angle from the initial phase is defined to as a phase angle. In short, the phase angle of the constant velocity joint 10 rotated a quarter turn or a half turn is 90° or 180°, respectively.

Figure 8:
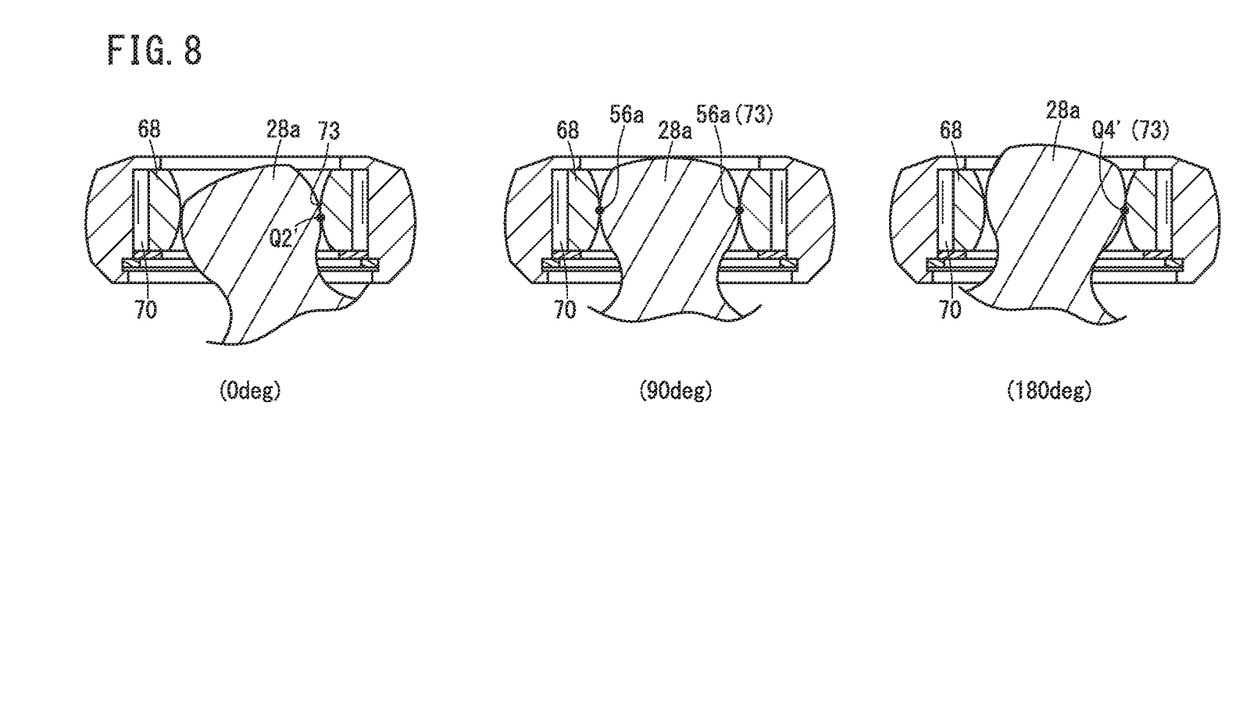
FIG. 8 is a schematic flow diagram illustrating changes in the position of an inner member, including a typical holding portion with a uniform diameter, with respect to a phase angle.

FIG. 8 illustrates a typical spherical trunnion 28a having a uniform diameter positioned at the phase angles of 0°, 90°, and 180° when the joint angle is 12°. With this structure, the curved surface of the trunnion 28a and the minimum inside-diameter part 73 of the inner roller 68 are easily brought into contact with each other when the phase angle is within a range of 0°-90°. Note that the curved surface of the trunnion 28a is brought into contact with the minimum inside-diameter part 73 at a contact point Q2' at 0° and a top part 56a at 90°.

However, once the phase angle exceeds 90°, the curved surface of the trunnion 28a is not easily brought into contact with the minimum inside-diameter part 73 until the phase angle exceeds 270°. When the phase angle is 180°, for example, the minimum inside-diameter part 73 and a point Q4' on the curved surface of the trunnion 28a facing the minimum inside-diameter part 73 are slightly separated from each other.

The position of the trunnion 28a when the phase angle is 270° is substantially identical to that when the phase angle is 90°. When the phase angle exceeds 270° and approaches 360° (returns to 0°), the sidewall of the trunnion 28a, in particular, part adjacent to the top part 56a, may push up the minimum inside-diameter part 73. This causes the roller assembly 38 to be inclined with respect to the trunnion 28a; that is, the roller assembly 38 is inclined with respect to the corresponding guide groove 18.

At this moment, part of the roller assembly 38 may locally come into contact with, for example, the inner wall of the guide groove 18. This contact prevents the roller assembly 38 from sliding smoothly along the guide groove 18, resulting in an increase in rotational resistance. As a result, resistance occurs when the roller assembly 38 moves along the guide groove 18, and by extension, when the inner member 14 moves in a direction along which the inner member 14 protrudes from or is inserted into the bottomed hole (the opening) of the cup portion 16. That is, so-called induced thrust is produced.

Figure 9:
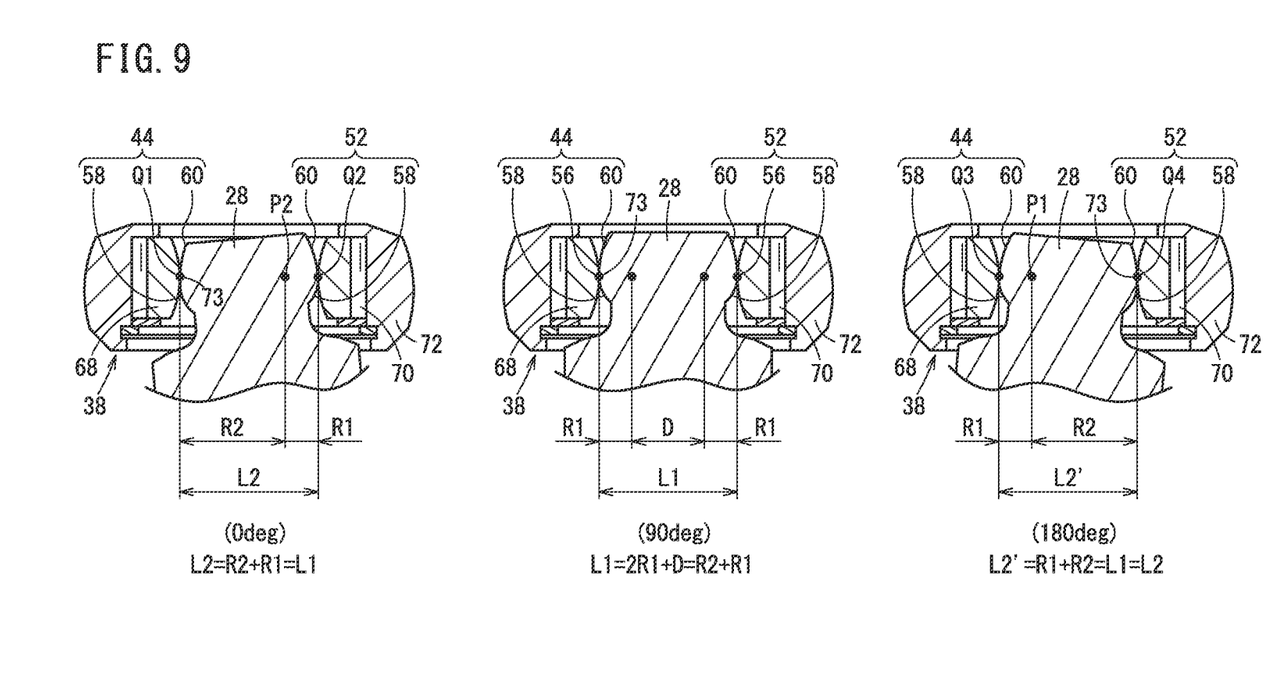
FIG. 9 is a schematic flow diagram illustrating changes in the position of an inner member, including the holding portion illustrated in FIGS. 4 to 7, with respect to the phase angle.

Next, FIG. 9 illustrates the trunnion 28 constituting the constant velocity joint 10 according to this embodiment positioned at the phase angles of 0°, 90°, and 180° when the joint angle is 12°. In this case, the top parts 56 in the curved surfaces of the second protrusion 44 and the fourth protrusion 52 of the trunnion 28 are brought into contact with the minimum inside-diameter part 73 of the inner roller 68 when the phase angle is 90°.

As described above, the curvature centers of the first curved surface 58 and the second curved surface 60 of the second protrusion 44 are the points P1 and P2, respectively, and the curvature centers of the first curved surface 58 and the second curved surface 60 of the fourth protrusion 52 are the points P2 and P1, respectively. Thus, the curvature radius R2 of the second curved surface 60 equals to the sum of the curvature radius R1 of the first curved surface 58 and the distance D between the curvature centers P1 and P2. In addition, when the phase angle is 90°, a distance L1 between the top parts 56 that are in contact with the minimum inside-diameter part 73 equals to the sum of the curvature radius R1 of the first curved surface 58 of the second protrusion 44, the distance D between the curvature centers P1 and P2, and the curvature radius R1 of the first curved surface 58 of the fourth protrusion 52. That is, the following relation holds:

$$L1=R1+D+R1.$$

(R1+D) in the relation equals to R2. Consequently, L1 can be defined using R1 and R2 as follows:

$$L1=R2+R1.$$

When the phase angle is 0°, the second curved surface 60 of the second protrusion 44 and the first curved surface 58 of the fourth protrusion 52 are brought into contact with the minimum inside-diameter part 73 at a contact point Q1 and a contact point Q2, respectively. The contact points Q1 and Q2 are both part of arcs having the point P2 as the curvature centers; thus, a distance L2 between the contact points Q1 and Q2 equals to the sum of R2 and R1. This leads to L2=L1.

Moreover, when the phase angle is 180°, the first curved surface 58 of the second protrusion 44 and the second curved surface 60 of the fourth protrusion 52 are brought into contact with the minimum inside-diameter part 73 at a contact point Q3 and a contact point Q4, respectively. The contact points Q3 and Q4 are both part of arcs having the point P1 as the curvature centers; thus, a distance L2' between the contact points Q3 and Q4 equals to the sum of R1 and R2. That is, L2 and L2' are equal to each other and also equal to L1. In conclusion, L2=L1=L2' holds.

Thus, in this embodiment, the distance between the contact point of the second protrusion 44 with respect to the minimum inside-diameter part 73 and the contact point of the fourth protrusion 52 with respect to the minimum inside-diameter part 73 is constant regardless of the phase angle. That is, while the phase angle changes, in other words, while the constant velocity joint 10 rotates, the second protrusion 44, the fourth protrusion 52, and furthermore, the first protrusion 40 and the third protrusion 48, are kept in contact with the minimum inside-diameter part 73. This leads to a stable contact load.

Figure 10:
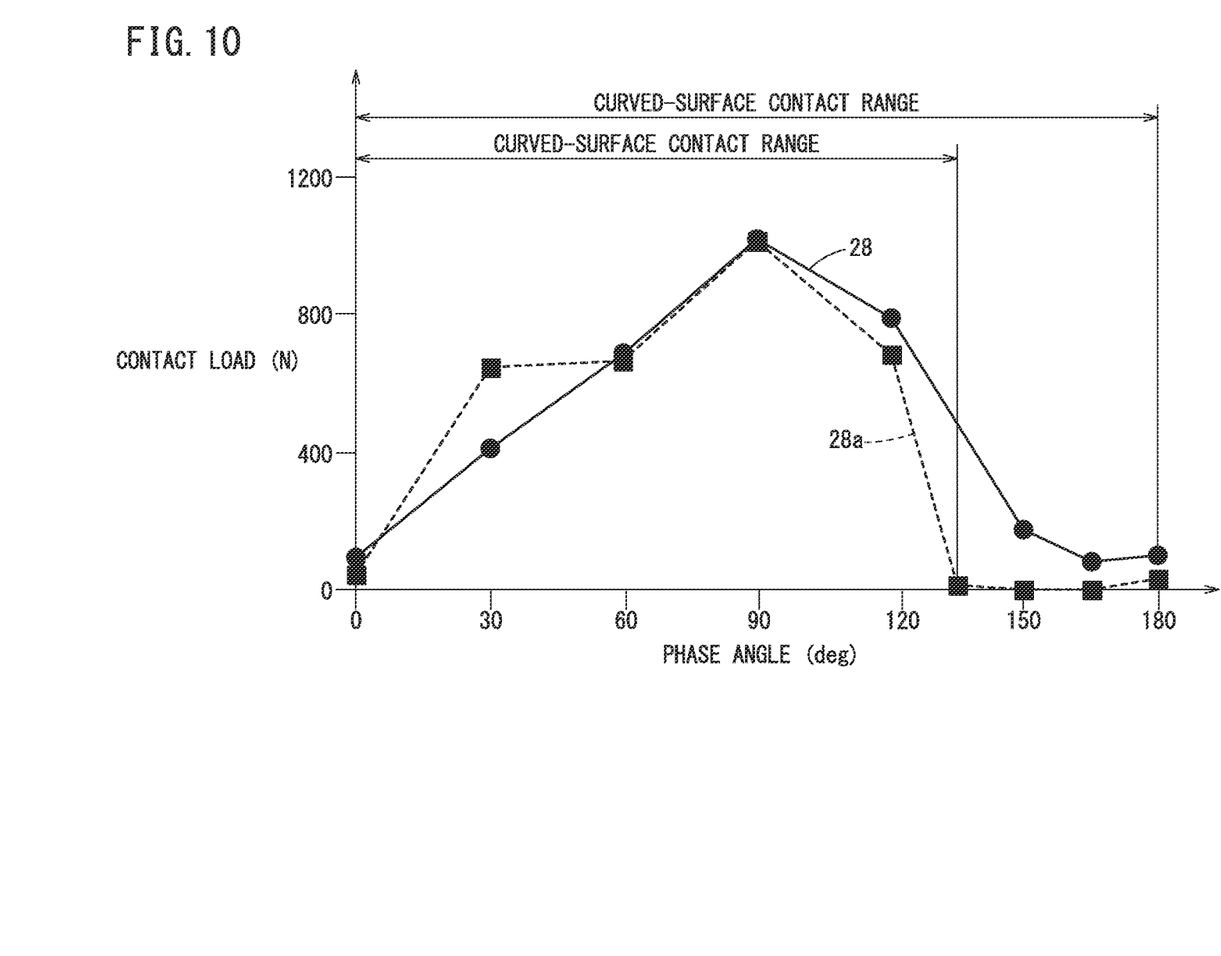
FIG. 10 is a graph illustrating the relationship between the phase angle and contact load at the holding portion of the constant velocity joint according to the embodiment.

FIG. 10 is a graph illustrating the relationships between the phase angle and the contact load at the trunnions 28a and 28. As can be seen from FIG. 10, the contact load at the trunnion 28 is more stable than the contact load at the trunnion 28a especially in a large phase angle range. This is presumably because, as indicated as "curved-surface contact range" in FIG. 10, the second protrusion 44 and the fourth protrusion 52 of the trunnion 28 are in contact with the minimum inside-diameter part 73 regardless of the phase angle, whereas some region of the trunnion 28a in parts corresponding to the second protrusion 44 and the fourth protrusion 52 is not brought into contact with the minimum inside-diameter part 73.

Figure 11:
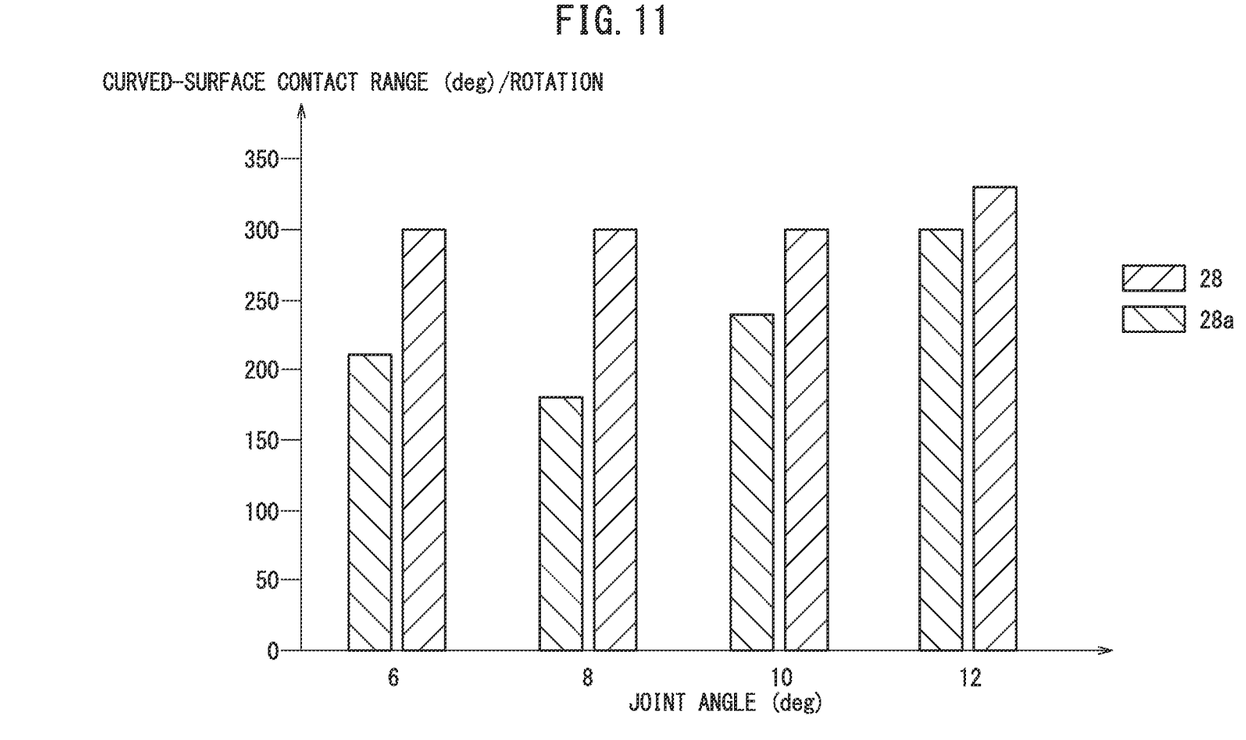
FIG. 11 is a graph illustrating a contact range of a first orthogonal part or a second orthogonal part by the angle when the phase angle changed from 00 to 360°.

Although FIGS. 8 and 9 illustrate only the cases where the joint angle was 12°, FIG. 11 illustrates contact ranges of the second protrusion 44 or the fourth protrusion 52 with the minimum inside-diameter part 73 by the angle when the phase angle changes from 0° to 360° (in other words, the constant velocity joint 10 made one turn) at the joint angle of 6°, 8°, and 10° in addition to 12°. For example, the contact range of 300° implies that the second protrusion 44 or the fourth protrusion 52 is in contact with the minimum inside-diameter part 73 in a range of 300° while the phase angle changes from 0° to 360°.

As can be seen from FIG. 11, the contact range of the second protrusion 44 or the fourth protrusion 52 with the minimum inside-diameter part 73 in the trunnion 28 is greater than that in the trunnion 28a regardless of the joint angle.

Moreover, in this embodiment, the distance between the contact points of the second protrusion 44 and the fourth protrusion 52 with respect to the minimum inside-diameter part 73 is constant regardless of the phase angle as illustrated in FIG. 9. Thus, the second protrusion 44 and the fourth protrusion 52 are prevented from pushing up the minimum inside-diameter part 73. This prevents an increase in the rotational resistance of the roller assembly 38.

In addition, since the second protrusion 44 and the fourth protrusion 52 are in contact with the minimum inside-diameter part 73, each roller assembly 38 is kept parallel to the corresponding guide groove 18 while the driving force of the shaft portion 20 is transmitted to the outer member 12 via the trunnions 28 of the inner member 14 and the roller assemblies 38 and then to the second transmission shaft 22. As a result, the constant velocity joint 10 achieves low sliding resistance and, in addition, excellent durability.

Figure 12:
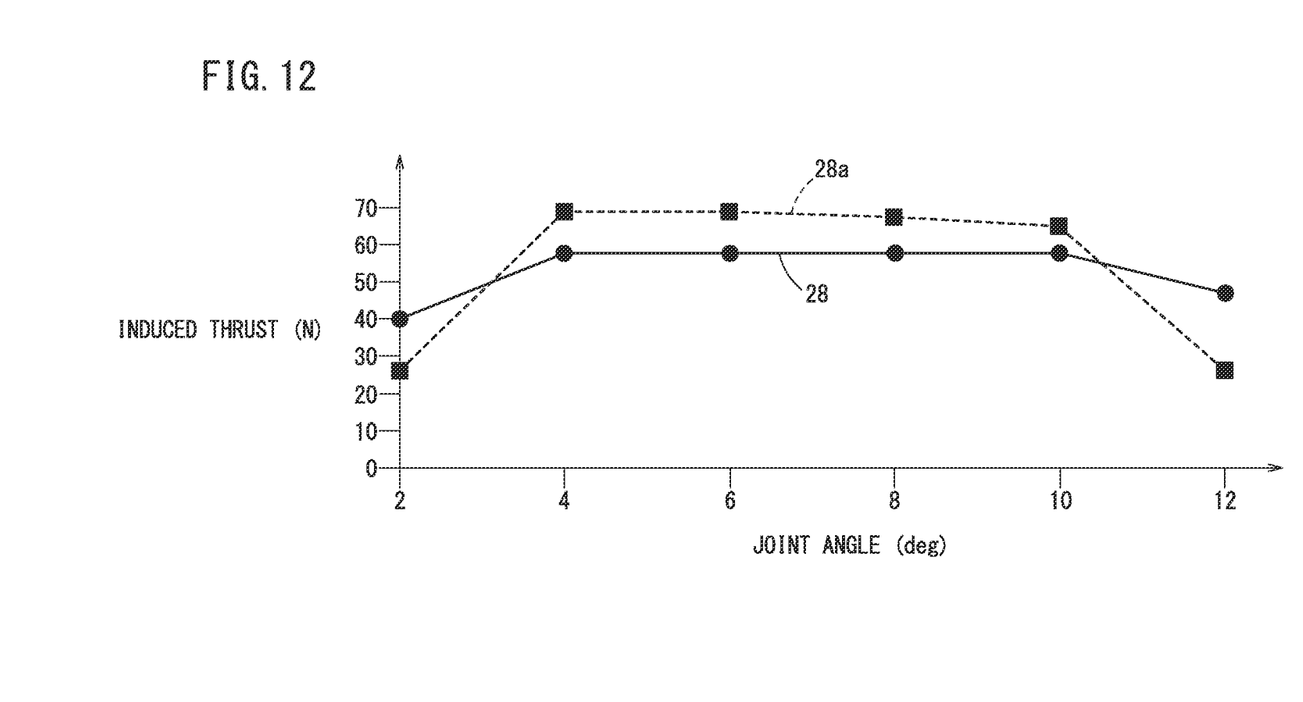
FIG. 12 is a graph illustrating the relationships between a joint angle and induced thrust in the constant velocity joint according to the embodiment and in a typical constant velocity joint.

FIG. 12 is a graph illustrating the relationships between the joint angle and induced thrust in the constant velocity joint 10 including the trunnion 28 and in a typical constant velocity joint including the trunnions 28a. As can be seen from FIG. 12, the induced thrust in the constant velocity joint 10 according to this embodiment is, for most part of the joint angle, lower than the induced thrust in the typical constant velocity joint. One reason for the reduction in the induced thrust is that the sliding resistance of the trunnion 28 is reduced compared with that of the trunnion 28a.

The present invention is not limited in particular to the embodiment described above, and various modifications can be made thereto without departing from the scope of the present invention.

For example, more protrusions may be disposed between the first protrusion 40 and the second protrusion 44, between the second protrusion 44 and the third protrusion 48, between the third protrusion 48 and the fourth protrusion 52, between the fourth protrusion 52 and the first protrusion 40, and the like to increase the contact parts between the inner roller 68 and the trunnion 28.

What is claimed is:

1. A constant velocity joint disposed between a first transmission shaft and a second transmission shaft to transmit rotational driving force from the first transmission shaft to the second transmission shaft, comprising:

an outer member provided with a plurality of guide grooves in an inner wall of the outer member and connected to the first transmission shaft, the plurality of guide grooves being separated from each other at a predetermined distance and extending in an axial direction of the outer member;

an inner member including an annular portion and a plurality of holding portions, connected to the second transmission shaft, and fitted in the outer member, each of the holding portions protruding from the annular portion toward the corresponding guide groove and including a proximal end adjacent to the annular portion and a distal end adjacent to the guide groove; and a plurality of roller assemblies each including an inner roller and an outer roller and rotatably attached to the corresponding holding portion, the outer roller being attached to an outside of the inner roller via a rolling member, wherein an inside diameter of each inner roller in the plurality of roller assemblies is smallest at a middle part between a proximal end and a distal end of each inner roller, the proximal end of each inner roller is located nearest to the proximal end of the inner member annular portion and a distal end is located nearest to the distal end of the inner member annular portion, wherein:

each of the holding portions is provided with a plurality of contact parts brought into contact with an inner circumferential wall of the corresponding inner roller and a plurality of non-contact parts separated from the inner circumferential wall of the inner roller, the contact parts and the non-contact parts being disposed alternately;

the contact parts include at least a first parallel part and a second parallel part having a phase difference of 180° between each other, virtual tangents to the respective parallel parts being parallel to a longitudinal direction of the guide grooves, and a first orthogonal part and a second orthogonal part having a phase difference of 180° between each other, virtual tangents to the respective orthogonal parts being orthogonal to the longitudinal direction of the guide grooves;

sidewalls of the first parallel part and the second parallel part are straight in a front cross-section passing through the first parallel part, a radial center of the holding portion, and the second parallel part;

sidewalls of the first orthogonal part and the second orthogonal part are curved in a side cross-section passing through the first orthogonal part, the radial center of the holding portion, and the second orthogonal part; and the sidewalls of the first orthogonal part and the second orthogonal part are brought into contact with the inner circumferential wall of the inner roller at respective top parts when the first transmission shaft and the second transmission shaft are coaxially disposed, and, when curved surfaces of the first orthogonal part and the second orthogonal part extending from adjacent to the proximal end toward the respective top parts are defined as first curved surfaces and curved surfaces of the first orthogonal part and the second orthogonal part extending from the respective top parts toward the distal end are defined as second curved surfaces, a curvature radius of the second curved surfaces is larger than a curvature radius of the first curved surfaces.

2. The constant velocity joint according to claim 1, wherein, the sidewalls of the first orthogonal part and the second orthogonal part are brought into contact with the inner circumferential wall of the inner roller at respective contact points when the first transmission shaft is inclined with respect to the second transmission shaft, and, when a distance between the top parts on the first orthogonal part and the second orthogonal part and a distance between the contact points on the first orthogonal part and the second orthogonal part are defined as L1 and L2, respectively, L1 equals to L2.

3. The constant velocity joint according to claim 1, wherein, a curvature center of the first curved surface of the first orthogonal part coincide with a curvature center of the second curved surface of the second orthogonal part, and a curvature center of the second curved surface of the first orthogonal part coincide with a curvature center of the first curved surface of the second orthogonal part.

4. The constant velocity joint according to claim 1, wherein the inner roller is brought into contact with the first orthogonal part and the second orthogonal part at a part having a minimum inside diameter.

* * * * *